INVENTOR.
ELMER C. EVANS
BY
ATTORNEYS

DIODE HEAT SINK AND CIRCUIT MOUNT

Filed Jan. 14, 1965 2 Sheets-Sheet 2

INVENTOR.
ELMER C. EVANS
BY
ATTORNEYS

United States Patent Office 3,320,498

Patented May 16, 1967

3,320,498

DIODE HEAT SINK AND CIRCUIT MOUNT

Elmer C. Evans, 4278 3rd Ave., San Diego, Calif. 92103

Filed Jan. 14, 1965, Ser. No. 425,641
4 Claims. (Cl. 317—234)

ABSTRACT OF THE DISCLOSURE

This disclosure relates to a unitary mounting assembly for four solid state diodes arranged in a full-wave bridge rectifier configuration. The structure serves the multiple functions of a heat sink, electrical conductor and filtering capacitor.

The invention described herein may be manufactured and used by or for the Government of the United States of America for governmental purposes without the payment of any royalties thereon or therefor.

This invention relates to rectifiers and is particularly directed to mounting assemblies for solid state diodes in full wave power converters.

The object of this invention is to provide an improved alternating current-to-direct current rectifier.

A more specific object of this invention is to provide an improved full wave rectifier assembly which is structurally small, compact and unitary, and yet has high power handling capability without overheating.

Other objects will appear to those skilled in the art by referring to the embodiments described in the following specification and shown in the accompanying drawings in which.

Figure 4:
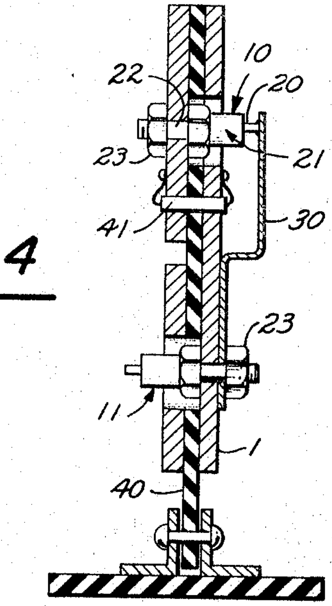
FIG. 4 is a sectional view taken on line 4—4 of FIG. 1.

The four diodes 10, 11, 12 and 13 employed in a full wave balanced four-sided bridge are of the solid state type and are capable of handling considerable power with minimum overheating. The particular diode contemplated is of the type shown, for example, in elevation in FIG. 4 comprising an envelope 21 with an integral bolt 22 threaded and adapted to receive a tightening nut 23. The envelope and bolt are in good thermal contact with the cathode electrode, not shown, of the diode. The anode lead 20 is centered in the opposite end of the envelope in an insulating disc. The envelope and base bolt 22 are relatively massive so that when seated in a metal plate, as shown in FIG. 4, there is relatively good heat transfer from the envelope to the plate.

Figure 1:
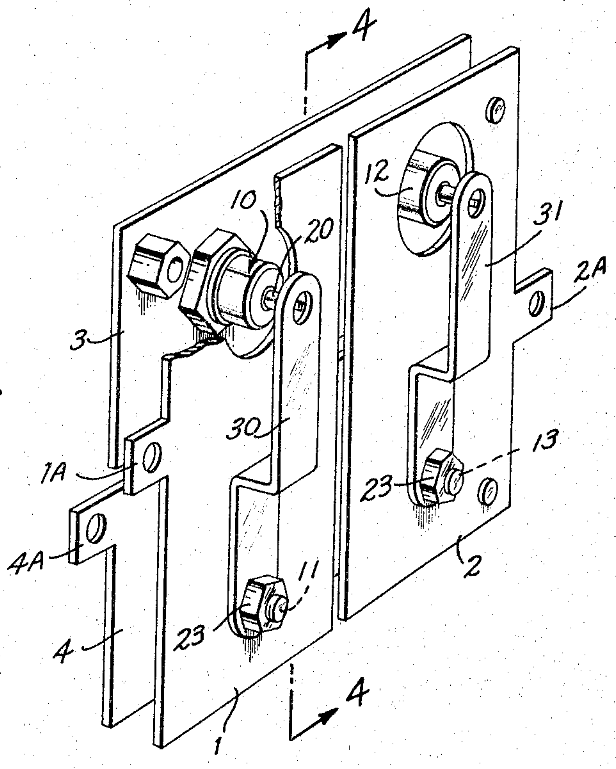
FIGS. 1 and 2 are respective views, at different angles, of the preferred embodiment of the rectifier assembly of this invention.
Figure 2:
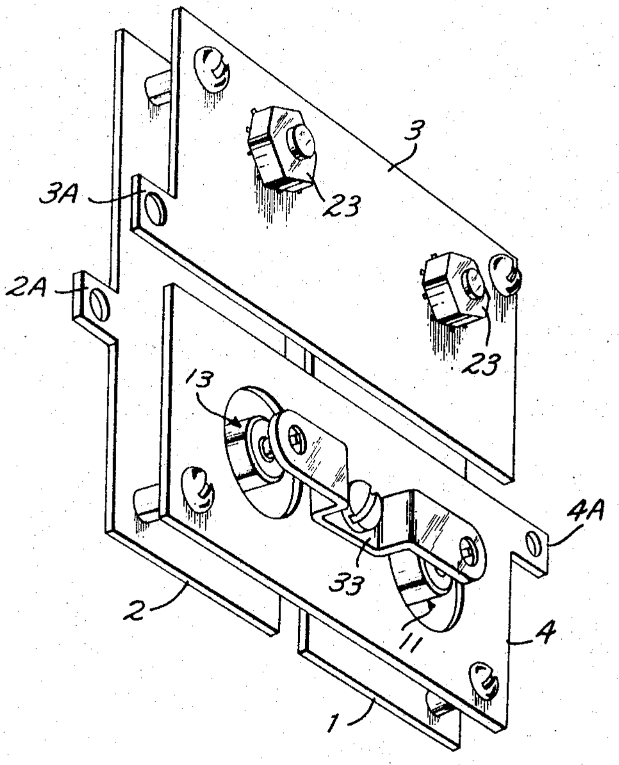

As shown in FIGS. 1 and 2, the four rectifiers 10, 11, 12 and 13 are mounted on flat rectangular oblong plates 1, 2, 3, and 4. Significantly, the four plates are arranged in two pairs, one pair being at right angles to the other pair so that each plate of one pair overlies and is capacitively coupled to each of the plates of the other pair. The cathode connections of diodes 10 and 12 are mounted on plate 3, as shown in FIG. 1, while the cathodes of diodes 11 and 13 are mounted, respectively, on plates 1 and 2, best seen in FIG. 2. The anode connections in each case are made to the plate which overlies the supporting cathode plate. The anode 20 of diode 10 is electrically connected to plate 1 through the strap 30 which is caught and held under the anchoring nut 23 of diode 11. The opposite end of the strap is soldered, brazed or otherwise electrically connected to the end of the anode lead 20. The anode of diode 12 is likewise connected to plate 2 through strap 31, as shown in FIG. 1, the anodes of diodes 11 and 13 are both connected to plate 4 through strap 33 which is anchored to the plate 4 by means of a short tap screw.

Figure 3:
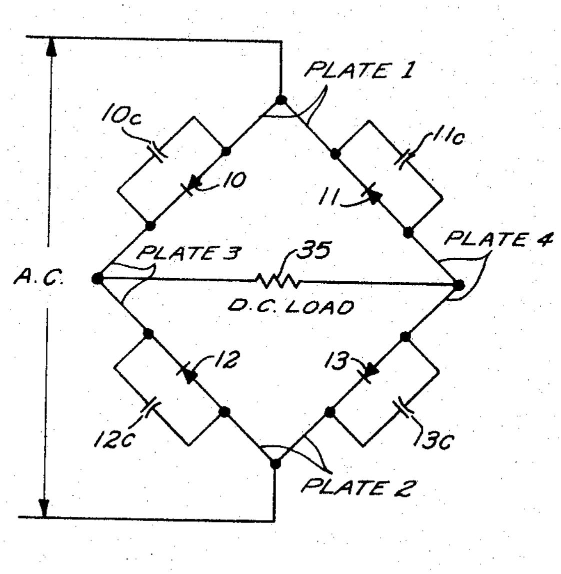
FIG. 3 is a schematic circuit digram of the rectifiers of FIG. 1.

For convenience of illustration, the equivalent circuit of the full wave rectifier of FIGS. 1 and 2 is shown in FIG. 3. Each of the diodes 10, 11, 12 and 13 is shunted by the capacity **10*c*, 11*c*, 12*c* and 13*c*, respectively. The capacities comprise, according to this invention, the overlying areas of registering plates, as shown. With the alternating current supply connected to terminals 1A and 2A, respectively, on plates 1 and 2, and with the direct current load connected between terminals 3A and 4A, forward current will flow first through the series circuit including diode 10, load resistance 35 and diode 13. During the next half cycle current flows forwardly through diode 12, load 35 and diode 11**.

The four inter-plate capacities **10*c*, 11*c*, 12*c* and 13*c* correspond, respectively, to the effective inter-plate capacities across each diode. It will be noted that with respect to the D.C. load 35, capacities 10*c* and 11*c* are in series which, in turn, are in parallel with capacities 12*c* and 13*c*. The magnitude of the capacities depends, as expected, upon the area of the overlying plates, their spacing, and the dielectric constant of the insulation. Air insulation is intended in the embodiment of FIG. 1. The plates preferably are spaced as shown with threaded insulating bolts or studs. Threaded screws of Teflon material are suited for rigidly mounting the plates 1, 2, 3 and 4** of this invention. Stand-off insulations minimize heat dissipation via connection.

Alternatively, the mounting plates 1–4 may be mounted directly on an insulating sheet such as shown at 40 in FIG. 4. By extending the sheet beyond one periphery of the condenser plates a convenient support is provided. It is suggested in FIG. 4 that the sheet be relatively stiff so that when attached to a chassis frame the entire diode assembly may be free-standing.

Conveniently, the assembly may be drilled through as shown in FIG. 4 and a tubular resistor element 41 inserted in the bore and the terminals of the resistor soldered to the adjacent plates to provide balancing resistors across each of the diodes.

The unitary diode assembly of this invention is particularly shock resistant. The cathodes are not only bolted and seated solidly on each of the heat radiating plates but the anodes are similarly structurally anchored to the connected plates via the spring straps 30, 31 and 33. The straps are quite broad and flat for strength parallel to their plane but flexible laterally to permit easy expansion of the anode during operation. The area of the straps constitutes large heat radiating surfaces. Commercially obtainable diodes of the type known as 1N 250B were installed in a flat assembly of the type shown less than 4 inches by 4 inches square and were operated at 120 volts and 12 amperes for two hours with a net temperature gain of but 5° from an ambient temperature of 65° F.

Many modifications may be made in the details of this invention without departing from the scope of the invention as defined in the appended claims.

What is claimed is:

1. A unitary four-diode full-wave rectifier assembly for solid state diodes of the type having an envelope with a stud bolt at one end and an insulated lead coaxially aligned with said stud bolt at the other, said assembly comprising;

a first and a second pair of elongated rectangular metal plates, the plates of each pair being disposed in a spaced parallel arrangement to each other and in the same plane, one pair being spaced and supported in a plane parallel to the plane of the other pair and at right angles to the other pair so that each plate of one pair overlies and is capacitively coupled to one-half of each plate of the other pair, the envelope of two of said diodes being clamped to one plate of said first pair in good thermal and electrical contact and extending through and spaced from holes in the respective overlying portions of the plates of said second pair, the envelopes of the two additional of said diodes being clamped, respectively, to each plate of said second pair, and extending through and spaced from holes in the respective overlying portions of the plates of the first pair, and metal straps extending from each of said insulated leads to the adjacent plate.

2. The assembly defined in claim 1 further comprising;

terminal connecting means on each of said plates for connecting said diodes in said full-wave rectifier circuit.

3. In the assembly defined in claim 1;

said metal straps being clamped face-to-face at one end to the surface of said adjacent plate for good electrical and thermal contact, and being flexed outward at the other end for yieldable attachment to the associated insulated lead.

4. The assembly defined in claim 1 further comprising;

a sheet of insulating material between and substantially coextensive with said pairs of plates, at least one edge of said sheet extending beyond said plate for support attachment.

References Cited by the Examiner

UNITED STATES PATENTS

| | | | |
|---|---|---|---|
| 2,597,000 | 5/1952 | Hyde | 317—234 |
| 2,792,537 | 5/1957 | Martin | 317—234 |
| 3,054,933 | 9/1962 | Meykar | 317—234 X |

References Cited by the Applicant

UNITED STATES PATENTS

| | | |
|---|---|---|
| 2,819,435 | 1/1958 | Connell. |
| 2,974,263 | 3/1961 | Akins. |

JOHN W. HUCKERT, *Primary Examiner.*

A. M. LESNIAK, *Assistant Examiner.*